J. I. DOMINGUEZ.
APPARATUS FOR CATCHING FLIES.
APPLICATION FILED MAY 2, 1919.
1,359,796.
Patented Nov. 23, 1920.
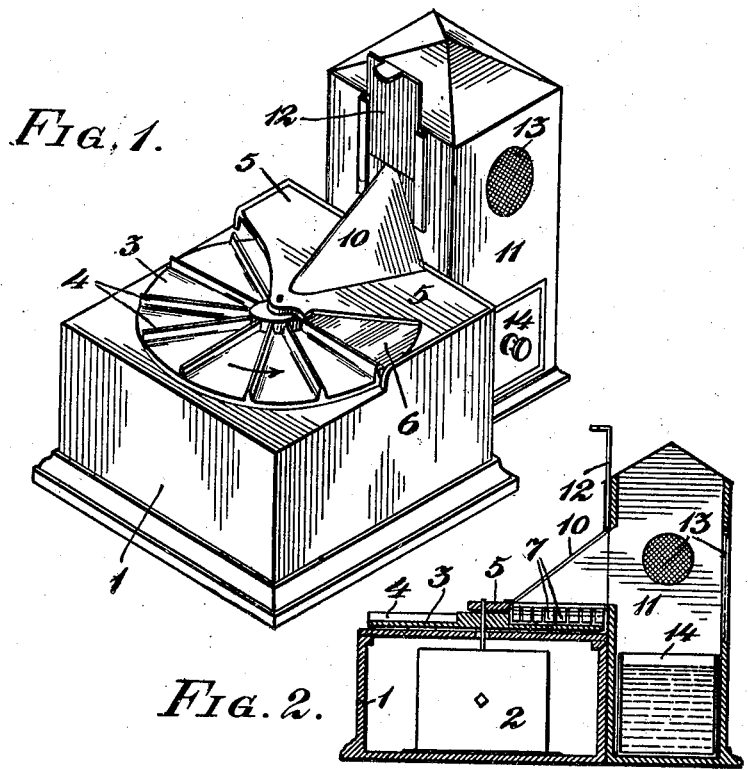
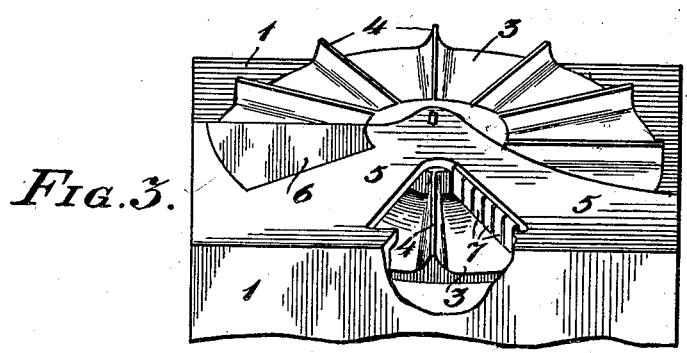
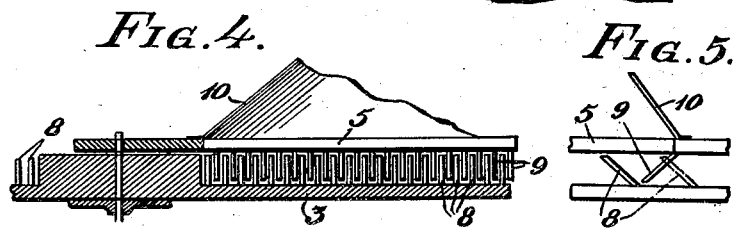
Inventor
J. I. Dominguez
By H. R. Kerslake
Atty.

UNITED STATES PATENT OFFICE.

JUAN ISMAEL DOMINGUEZ, OF BUENOS AIRES, ARGENTINA.

APPARATUS FOR CATCHING FLIES.

1,359,796.  Specification of Letters Patent.  Patented Nov. 23, 1920.

Application filed May 2, 1919. Serial No. 294,338.

*To all whom it may concern:*

Be it known that I, JUAN ISMAEL DOMINGUEZ, a citizen of the Argentine Republic, residing at calle Maipú 671, Buenos Aires, Argentine Republic, have invented new and useful Improvements in an Apparatus for Catching Flies, of which the following is a specification.

This invention relates to a novel apparatus for catching flies, substantially consisting of a rotating plate or disk, provided with a series of radial fins or webs which in succession pass below a cover of particular construction which forms the trap properly.

Between each of the webs of the plate, syrup or other suitable matter is placed, adapted to attract flies and induce the same to alight on the plate which by its slow rotation carries the insects to the point where the said cover is situated. In order that the flies when entering there beneath, shall not be scared by the sudden change of light, part of the said cover is formed of glass. By this arrangement, when the flies note something abnormal, they have already passed below the said glass and are trapped between the webs of the disk, the surface of the latter and the cover. The flies thus caught, are led by the rotating disk to an opening in communication with the collecting compartment toward which the flies are made to travel spontaneously on account of being in a dark place and noting the light in the said compartment, and also because they are driven out by a device which does not allow of the flies remaining any longer on the disk but obliges the same to fly.

The apparatus constructed in accordance with my invention is simple, efficient and hygienic in its use.

In order that the description may be readily understood, detailed drawings have been annexed thereto, in which:

Figure 1 represents a perspective of the fly catching apparatus, constructed in accordance with my invention.

Fig. 2 is an elevation of a central vertical section of the same.

Fig. 3 is a detail view of the opening in communication with the collecting compartment and of the means which oblige the flies to get off the disk and fly toward the said compartment.

Figs. 4 and 5 represent a modified arrangement of the means for obliging the flies to go out.

In said drawings, 1 indicates the casing in which is placed the clock work 2 or other suitable driving device. Said clockwork imparts a rotary motion to the plate or disk 3, provided on its upper surface with a series of radial fins or webs 4 which extend upward to a suitable height.

Above the said plate and partially covering the same, is arranged the cover 5, a section 6 of which is made of glass and within an opening provided at one of the sides of the cover is suitably fitted a fly intercepting device, formed by a series of freely suspended small plates or flaps 7, adapted to be raised by the webs 4 of the disk, but which prevent the flies from continuing to travel along with the disk and get out of the trap by the other side.

As may be seen in Figs. 4 and 5, the intercepting means may also consist of a series of combs 8, in substitution of the webs 4, and a fixed comb 9 which replaces the small plates or flaps 7. The movable combs of the disk may be inclined so as to prevent the bodies from being intercepted and interfere with the rotation of the disk.

The opening of the cover 5 is covered with the hopper like duct or passage 10, before which is arranged the collecting compartment 11, provided with a slidable door 12 which allows of closing the communication and prevents the flies from escaping when said compartment is removed from the apparatus. The compartment is provided with several openings 13, screened with a thinly meshed fabric. Said openings have for a purpose to allow of a certain illumination of the compartment, so as to induce the flies, by this means, to direct themselves toward the said compartment. The bottom of this latter may be plain or provided with a receptacle 14, adapted to contain water or other fluid, so that the flies may fall and accumulate in the same.

The operation of the apparatus is as follows:

By means of the clock work 2 or other suitable driving device, the disk 3 is caused to slowly rotate in the direction of the arrow in Fig. 1. The flies alighting on the surface between the fins or webs 4, to which syrup or other similar matter has been applied, will be led toward the place where the glass cover 6 is arranged, which owing to the light allowed to pass through, will not scare away the insects. When passing to the dark section following the said glass, the flies will be scared by the sudden darkness, but will not be able to escape as they are now caught between the webs, the base of the disk and the cover.

As rotation continues, the flies will come before the opening provided at the cover where they will note the light coming from the collecting compartment 11 which will induce them to fly into the same by the hopper shaped passage 10. The flies may be extracted from the compartment from time to time as may be deemed necessary.

The flies which should still remain on the disk will be obliged to fly about owing to the action of the intercepting means formed by the small plates 7 or by the comb 9, when instead of the webs, the combs 8 are secured on the disk. It will be understood that the dimensions as well as the materials used in connection with the apparatus may be chosen as thought most convenient.

Having now particularly described and ascertained the nature of my said invention and in what manner the same is to be performed, I declare that what I claim, is:

A fly trap including a main casing, a prime mover in the casing, a bait receiving disk rotatably mounted above the casing and connected with the mover so as to be rotated thereby, a plurality of radial ribs on the upper surface of the disk, a flat opaque cover on the casing, covering a segment of the disk and provided with a transparent insert in one of its edge portions, the central portion of the cover being apertured, a hood arranged over and communicating with the opening in the cover, the hood being provided with an outlet end having a straight vertical edge, a plurality of flexible flaps depending from the cover near one edge of the opening remote from the insert, coacting with the ribs for causing flies to enter said hood, a screened collector removably connected with the casing and having an opening adapted to communicate with the outlet of said hood, and a door for closing the last named opening.

JUAN ISMAEL DOMINGUEZ

Witnesses:
A. L. BELLO,
L. H. FORIANO.